United States Patent
Ajgaonkar

(10) Patent No.: US 7,480,465 B2
(45) Date of Patent: Jan. 20, 2009

(54) RECEIVER FOR A DIFFERENTIAL PHASE MODULATED SIGNAL

(75) Inventor: Mahesh U. Ajgaonkar, Holland, PA (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 548 days.

(21) Appl. No.: 11/330,526

(22) Filed: Jan. 12, 2006

(65) Prior Publication Data

US 2006/0153577 A1    Jul. 13, 2006

(30) Foreign Application Priority Data

Jan. 13, 2005    (DE) .................... 10 2005 001 678

(51) Int. Cl.
*H04B 10/06* (2006.01)
*H04J 14/08* (2006.01)
*H01S 3/00* (2006.01)

(52) U.S. Cl. .................. 398/203; 398/204; 398/52; 398/53

(58) Field of Classification Search ............. 398/52–53
See application file for complete search history.

(56) References Cited

U.S. PATENT DOCUMENTS 5,375,004 A * 12/1994 Ogura ..................... 398/53
5,675,432 A * 10/1997 Kosaka ................. 359/337.13

OTHER PUBLICATIONS

Eric A. Swanson, Jeffrey C. Livas, and Roy S. Bondurant; "High Sensitivity Optically Preamplified Direct Detection DPSK Receiver with Active Delay-Line Stabilization"; IEEE Photonics Technology Letters; Feb. 1994; pp. 263-265; vol. 6, No. 2.

* cited by examiner

*Primary Examiner*—Kenneth N Vanderpuye
*Assistant Examiner*—Danny W Leung
(74) *Attorney, Agent, or Firm*—Bell, Boyd & Lloyd LLP

(57) ABSTRACT

The receiver features a first splitter which divides a differential phase modulated signal into three signal components from which at least two signal components are routed via timers. The first timer has a delay of a half period of the carrier signal and thereby serves in a conventional way for phase comparison and thus for demodulation. The second timer is adjustable and is used to compensate for the dispersion.

11 Claims, 2 Drawing Sheets

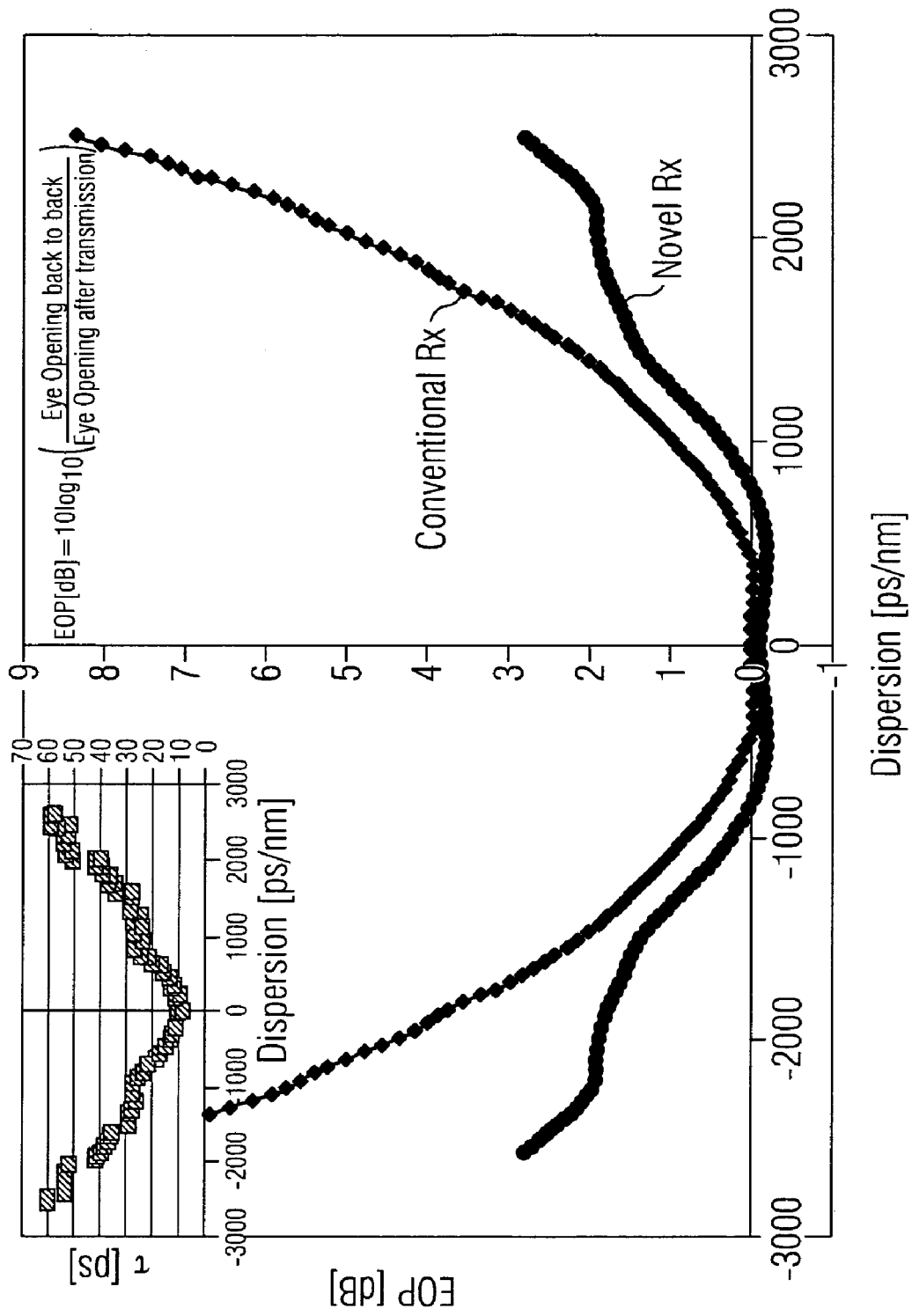

RECEIVER FOR A DIFFERENTIAL PHASE MODULATED SIGNAL

CROSS REFERENCE TO RELATED APPLICATIONS

This application claims priority of German application No. 102005001678.2 DE filed Jan. 13, 2005, which is incorporated by reference herein in its entirety.

FIELD OF INVENTION

The invention relates to a receiver for an optical differential phase modulated signal.

BACKGROUND OF INVENTION

The main methods for transmission of optical signals are amplitude phase modulation or advantageously binary differential phase shift keying BDPSK. For demodulation of differential phase modulated signals what are referred to as receive arrangements are used, of which the optical outputs are routed via opto-electrical converters (photodiodes) to the differential inputs of an amplifier which outputs a demodulated electrical data signal. Although this receiver type, when compared to "unbalanced" receivers, exhibits an improved function, it is however sensitive in relation to the dispersion of the transmission fibers (Group Velocity Dispersion—GVD).

SUMMARY OF INVENTION

An object of the invention is to specify an improved receiver for differential phase modulated signals.

This object is achieved by a receiver in accordance with claim the independent claim.

Dividing the receiver up into different components, combined with an adjustable timer, makes it possible for the device to operate like a filter, via which a signal passing through the dispersion is concentrated again and the dispersion effects are thus compensated for.

A division into signal components in the ratio 50%, 25%, 25% has proved useful, with a correction of one of the smaller signal components being sufficient.

The second timing element used for correction should be able to be adjusted as a rule to facilitate adaptation to the different transmission conditions.

A "balanced" opto-electrical converter with two photo diodes and a differential amplifier is usefully connected to the outputs of the combiners (splitters used as summators) in order to reduce the effect of noise and achieve optimum performance.

BRIEF DESCRIPTION OF THE DRAWINGS

The invention is explained in greater detail below with reference to an exemplary embodiment. The figures show:

FIG. 2 a receive diagram.

DETAILED DESCRIPTION OF INVENTION

Figure 1:
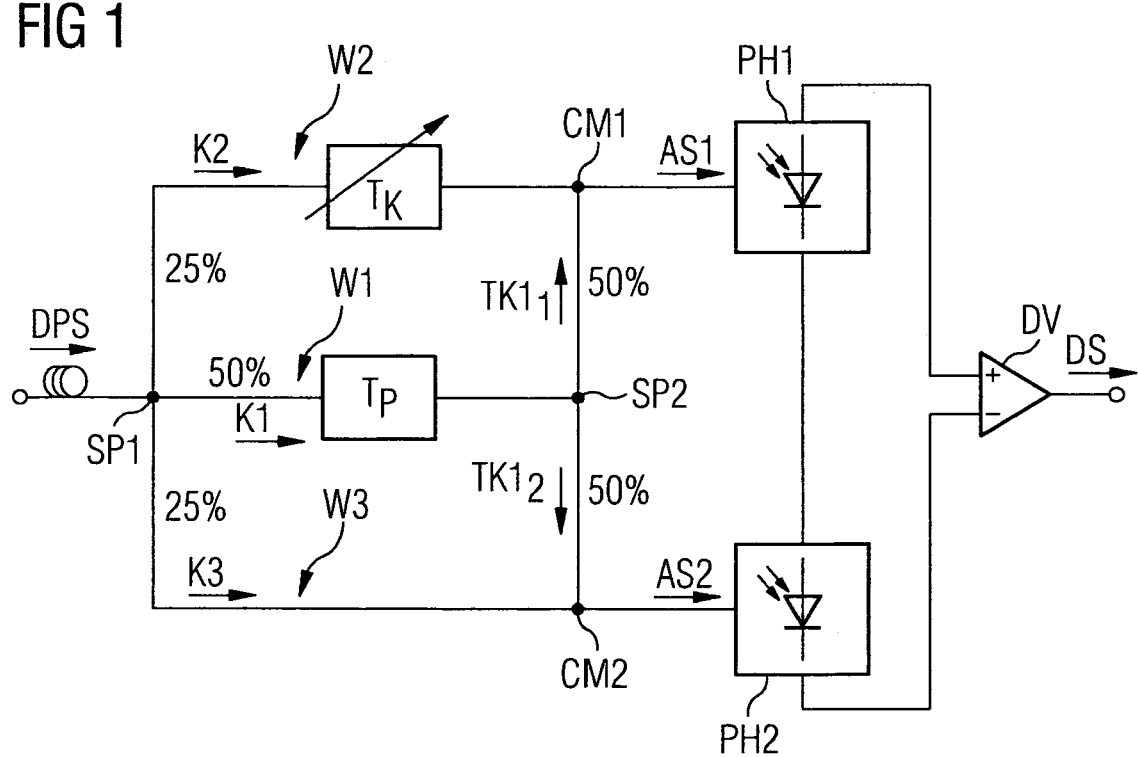
FIG. 1 the basic structure of a DPSK receiver.

FIG. 1 shows the basic structure of the DPSK receiver. A differential phase-modulated signal DPS is fed to its input, which is at the same time the input of a first splitter SP1. The splitter SP1 divides this signal into three signal components K1, K2, K3. The larger signal component K1, which is twice as large as the other two signal components K2 or K3, is routed via a first signal path W1 containing a timing element $T_P$ for which the runtime with binary DPSKs amounts to half a period of the carrier signal. A second splitter SP2, which divides the signal into two component parts TK1 and TK2, is arranged at the output of this timer. The second signal component K2 is routed via a second signal path W2 into which an adjustable timer $T_K$ is connected. The correspondingly delayed second signal component K2 is combined with the component part $TK1_1$ in a first combiner CM1. Likewise the second component $TK1_2$ is combined in a second combiner CM2 with the third signal component K3 which is routed via the third signal path W3 which in this exemplary embodiment does not contain a timer. The output signals AS1 and AS2 of the combiner CM1 and CM2 are routed via opto-electrical converters PH1 and PH2 (photodiodes) to the differential inputs of a differential amplifier DV, at the output of which a demodulated electrical data signal DS is output. The output signals of the combiners are calculated as $$AS1(f) = (e^{-j2\pi f\tau} + e^{-j2\pi fT})/2 = e^{-j\pi f(T+\tau)} \cos(\pi f(\tau - T))$$

and $$AS2(f) = (e^{-2\pi jT} - 1)/2 = j \cdot e^{-j\pi fT} \sin(\pi fT),$$

with f being the frequency of the carrier signal and T and τ the run times of the timers $T_P$ and $T_K$. The attenuation of the receiver can be compensated for by optical amplifiers. Adapting to or compensating for the dispersion is undertaken by the adjustable timer $T_K$.

FIG. 2 shows the general sequence of the "eye opening penalty" (EOP) for an approximately 60 km long transmission link with a dispersion of 17 ps/nm·km for an inventive receiver Novel RX and for a conventional receiver Conventional RX. The small diagram shows the delay time of the adjustable timer $T_K$ to obtain an optimum compensation. It should also be added that the second outputs (not shown) of the combiners can also be used for demodulation.

The invention claimed is:

1. A component for an optical differential phase modulated signal in a telecommunication network, comprising:
    a first splitter that divides the signal into first, second, and third signal components;
    a first signal path that routes the first signal component from the first splitter to a second splitter, the second splitter that divides the first signal component into two equal-size component parts;
    a second signal path that routes the second signal component from the first splitter;
    a third signal path that routes the third signal component from the first splitter;
    a first combiner having a first input that receives the first equal-size component part and having a second input that receives the second signal from the second signal path, the first combiner that combines the inputs to form a first optical signal;
    a second combiner having a first input that receives the second equal-size component part and having a second input that receives the third signal from the third signal path, the second combiner that combines the inputs to form a second optical signal;
    a first timer that has a delay of a half period of a carrier signal and connects to the first signal path; and
    an adjustable timer connects to the second signal path.

2. The component according to claim 1, wherein the signal is divided on the signal paths in the ratios 50%, 25%, 25%.

3. The component according to claim 1, wherein the component is a receiver.

4. The component in accordance to claim 1, wherein an opto-electrical converter is connected to first and second optical signals, the output of the converter is routed to the input of a differential amplifier.

5. A receiver for an optical differential phase modulated signal, comprising:
- a first splitter that divides the signal into first, second, and third signal components, the second and third signal components having equal size, the first splitter arranged on an input side of the receiver;
- a first signal path that routes the first signal component from the first splitter to a second splitter, the second splitter that divides the first signal component into two equal-size component parts;
- a first combiner having first and second inputs, the first combiner first input that receives the first equal-size component part;
- a second combiner having first and second inputs, the second combiner first input that receives the second equal-size component part;
- a second signal path that routes the second signal component from the first splitter to the first combiner second input;
- a third signal path that routes the third signal component from the first splitter to the second combiner second input;
- a first timer that connects to the first signal path; and
- a second timer connects to the second signal path,
- wherein each combiner outputs an optical signal.

6. The receiver according to claim 5, wherein the signal is divided on the signal paths in the ratios 50%, 25%, 25%.

7. The receiver according to claim 5, wherein the first timer has a delay of a half period of a carrier signal and the second timer is adjustable.

8. The receiver according to claim 6, wherein the first timer runs for a half period of a carrier signal and the second timer is adjustable.

9. The receiver in accordance to claim 5, wherein an opto-electrical converter is connected to the outputs of the first and second combiners, the output of the converter is routed to the input of a differential amplifier.

10. A method for receiving an optical differential phase modulated signal within a telecommunication network, comprising:
- splitting the signal first into first, second, and third signal components, the second and third signal components having equal size;
- routing the first signal component from the first splitter to a second splitter via a first signal path;
- routing the second signal component from the first splitter to a first combiner via a second signal path;
- routing the third signal component from the first splitter to a second combiner via a third signal path;
- dividing the first signal component into two equal-size component parts;
- combining the first equal size component part with the second signal component via the first combiner to form a first optical signal; and
- combining the second equal size component part with the third signal component via the second combiner to form a second optical signal,
- wherein a first timer has a delay of a half period of the signal for demodulation, and
- wherein an adjustable timer is provided in the second signal path to compensate for dispersion.

11. The method according to claim 10, wherein the signal is divided on the signal paths in the ratios 50%, 25%, 25%.

* * * * *